United States Patent
Nomura

(10) Patent No.: US 10,883,551 B2
(45) Date of Patent: Jan. 5, 2021

(54) FRICTIONAL ENGAGEMENT DEVICE

(71) Applicant: Honda Motor Co., Ltd., Tokyo (JP)

(72) Inventor: Shoji Nomura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 16/299,149

(22) Filed: Mar. 12, 2019

(65) Prior Publication Data
US 2019/0285126 A1    Sep. 19, 2019

(30) Foreign Application Priority Data

Mar. 13, 2018 (JP) .................. 2018-045248

(51) Int. Cl.
| | |
|---|---|
| *F16D 25/12* | (2006.01) |
| *F16D 13/74* | (2006.01) |
| *F16D 13/52* | (2006.01) |
| *F16D 13/69* | (2006.01) |
| *F16D 25/0638* | (2006.01) |

(52) U.S. Cl.
CPC .......... *F16D 25/123* (2013.01); *F16D 13/52* (2013.01); *F16D 13/69* (2013.01); *F16D 13/74* (2013.01); *F16D 25/0638* (2013.01)

(58) Field of Classification Search
CPC ........ F16D 13/52; F16D 13/683; F16D 13/69; F16D 13/74; F16D 25/0638; F16D 25/12; F16D 25/123; F16D 55/36; F16D 55/40
USPC ..................................................... 192/85.41
See application file for complete search history.

(56) References Cited

U.S. PATENT DOCUMENTS

| | | | |
|---|---|---|---|
| 6,305,521 B1* | 10/2001 | Hall, III ................ | F15B 21/044 |
| | | | 192/85.41 |
| 2011/0308911 A1* | 12/2011 | Heitzenrater ......... | F16D 13/648 |
| | | | 192/66.32 |
| 2017/0023072 A1* | 1/2017 | Tanaka .................... | F16D 13/52 |

FOREIGN PATENT DOCUMENTS

| | | |
|---|---|---|
| CN | 202371053 | 8/2012 |
| CN | 104995423 | 10/2015 |
| CN | 106122308 | 11/2016 |
| CN | 106369083 | 2/2017 |
| CN | 207034017 | 2/2018 |
| JP | 2012211665 | 11/2012 |

(Continued)

OTHER PUBLICATIONS

"Office Action of Japan Counterpart Application", dated Mar. 3, 2020, with English translation thereof, pp. 1-6.

(Continued)

*Primary Examiner* — Richard M Lorence
(74) *Attorney, Agent, or Firm* — JCIPRNET

(57) ABSTRACT

Provided is a frictional engagement device including outer and inner base bodies, outer and inner friction plates, a piston, a return spring, and a spring seat. Sliding grooves which guide sliding movement of the outer or inner friction plate in the axial direction are provided in at least one of the outer and inner base bodies at intervals in a circumferential direction, the outer or inner friction plate which slides in the sliding grooves includes protruding pieces fitted in the sliding grooves, a spring seat which is located on one end portion of each of the sliding grooves and supports one end of the return spring is provided on the outer or inner base body in which the sliding grooves are provided, and a through-hole which communicates with the sliding grooves and is capable of discharging lubricating oil that has accumulated in the sliding grooves is provided in the spring seat.

6 Claims, 3 Drawing Sheets

(56) References Cited

FOREIGN PATENT DOCUMENTS

| | | |
|---|---|---|
| JP | 2015135152 | 7/2015 |
| JP | 2016008679 | 1/2016 |
| JP | 2017026036 | 2/2017 |
| JP | 2017155789 | 9/2017 |

OTHER PUBLICATIONS

Office Action of China Counterpart Application, with English translation thereof, dated Mar. 19, 2020, pp. 1-11.
"Office Action of Japan Counterpart Application", dated Jul. 30, 2019, with English translation thereof, p. 1-p. 9.

* cited by examiner

ID-CROSS-REFERENCE TO RELATED
FRICTIONAL ENGAGEMENT DEVICE

CROSS-REFERENCE TO RELATED
APPLICATION

This application claims the priority of Japan patent application serial no. 2018-045248, filed on Mar. 13, 2018. The entirety of the above-mentioned patent application is hereby incorporated by reference herein and made a part of this specification.

BACKGROUND

Technical Field

The disclosure relates to a frictional engagement device.

Description of Related Art

Conventionally, a frictional engagement device configured by a brake is known (for example, refer to Patent Document 1).

A frictional engagement device including a cylindrical outer base body, an inner base body having an outer peripheral surface facing an inner peripheral surface of the outer base body and disposed inside the outer base body to be relatively rotatable, an outer friction plate provided to integrally rotate with an inner peripheral surface of the outer base body and to be slidable in a rotation axis direction, an inner friction plate provided to integrally rotate with an outer peripheral surface of the inner base body and to be slidable in the rotation axis direction, a piston which presses the outer friction plate and the inner friction plate in the rotation axis direction to generate a frictional force and synchronizes rotation of the outer base body and the inner base body, and a return spring which releases pressing of the outer friction plate and the inner friction plate by the piston is known (for example, refer to Patent Document 1).

In Patent Document 1, a plurality of sliding grooves which guide the sliding movement of the outer friction plate in an axial direction are provided on the outer base body at intervals in a circumferential direction. The outer friction plate which slides in the sliding groove has a protruding piece fitted in the sliding groove. A spring seat which is located at one end portion of each of the sliding grooves and supports one end of the return spring is provided on the outer base body having the sliding grooves.

[Patent Document 1] Japanese Unexamined Patent Application Publication No. 2015-135152

Since the spring seat of Patent Document 1 closes an end edge of the groove, there was a problem of lubricating oil accumulating in the groove.

SUMMARY

The disclosure provides a frictional engagement device capable of suppressing accumulation of lubricating oil.

[1] The disclosure provides a frictional engagement device (for example, a frictional engagement device of the embodiment, the same hereinafter) including a cylindrical outer base body (for example, an outer base body of the embodiment, the same hereinafter), an inner base body (for example, an inner base body of the embodiment, the same hereinafter) having an outer peripheral surface facing an inner peripheral surface of the outer base body and disposed inside the outer base body to be relatively rotatable, an outer friction plate (for example, an outer friction plate of the embodiment, the same hereinafter) provided on the inner peripheral surface of the outer base body to be rotatable integrally with the outer base body relative to the inner base body and to be slidable in a rotation axis direction, an inner friction plate (for example, an inner friction plate of the embodiment, the same hereinafter) provided to rotate integrally with the outer peripheral surface of the inner base body and to be slidable in the rotation axis direction, a piston (for example, a piston of the embodiment, the same hereinafter) which presses the outer friction plate and the inner friction plate in the rotation axis direction to generate a frictional force and synchronizes rotation of the outer base body and the inner base body, and a return spring (for example, a return spring of the embodiment, the same hereinafter) which releases a pressing of the outer friction plate and the inner friction plate by the piston, a plurality of sliding grooves (for example, outer sliding grooves or inner sliding grooves of the embodiment, the same hereinafter) which guide sliding movement of the outer friction plate or the inner friction plate in the axial direction are provided in at least one of the outer base body and the inner base body at intervals in a circumferential direction, the outer friction plate or the inner friction plate which slides in the sliding grooves includes protruding pieces (for example, outer protruding pieces or inner protruding pieces of the embodiment, the same hereinafter) fitted in the sliding grooves, a spring seat (for example, a spring seat of the embodiment, the same hereinafter) which is located on one end portion of the sliding grooves and supports one end of the return spring is provided on the outer base body or the inner base body in which the sliding grooves are provided, and a through-hole (for example, a through-hole of the embodiment, the same hereinafter) which communicates with the sliding grooves and is capable of discharging lubricating oil that has accumulated in the sliding grooves is provided in the spring seat.

[2] Further, in the disclosure, the frictional engagement device may be disposed in a case (for example, a case of the embodiment, the same hereinafter), the sliding grooves may be provided in at least the outer base body, and the outer base body may be fixed to the case.

[3] Further, in the disclosure, ribs (for example, ribs of the embodiment, the same hereinafter) may be provided on the spring seat.

[4] Further, in the configuration of the disclosure in which the frictional engagement device is disposed in a case, the sliding grooves are provided in at least the outer base body and the outer base body is fixed to the case, a cutout portion (for example, an escape portion of the embodiment, the same hereinafter) which is cut out in a circular arc shape may be provided in a radially inner end portion of the spring seat, and the ribs may be formed along the cutout portion in an arc shape on an inner side in a radial direction of the spring seat.

[5] Further, in the configuration of the disclosure in which the frictional engagement device is disposed in a case, the sliding grooves are provided in at least the outer base body and the outer base body is fixed to the case, and the through-hole may be located radially outside the spring seat.

[6] Further, in the disclosure, the through-hole may be located radially inward from the inner peripheral surface of the outer base body.

DESCRIPTION OF THE EMBODIMENTS

According to one embodiments of the disclosure, the lubricating oil that has accumulated in the sliding grooves is discharged from the through-hole of the spring seat. Therefore, it is possible to suppress accumulation of the lubricating oil in the sliding grooves.

According to one embodiments of the disclosure, the lubricating oil that has accumulated in the sliding grooves of the outer base body which is fixed to the case and is not rotatable can be discharged from the through-hole of the spring seat.

According to one embodiments of the disclosure, it is possible for the ribs to compensate for reduced durability of the spring seat due to the through-hole.

According to one embodiments of the disclosure, the arc-shaped ribs can compensate for the reduced durability of the spring seat due to the through-hole. Also, since the cutout portion which is cut out in a circular arc shape and has the ribs formed in a circular arc shape is provided in the radially inner end portion of the spring seat, the lubricating oil can also be discharged from the cutout portion.

Figure 1:
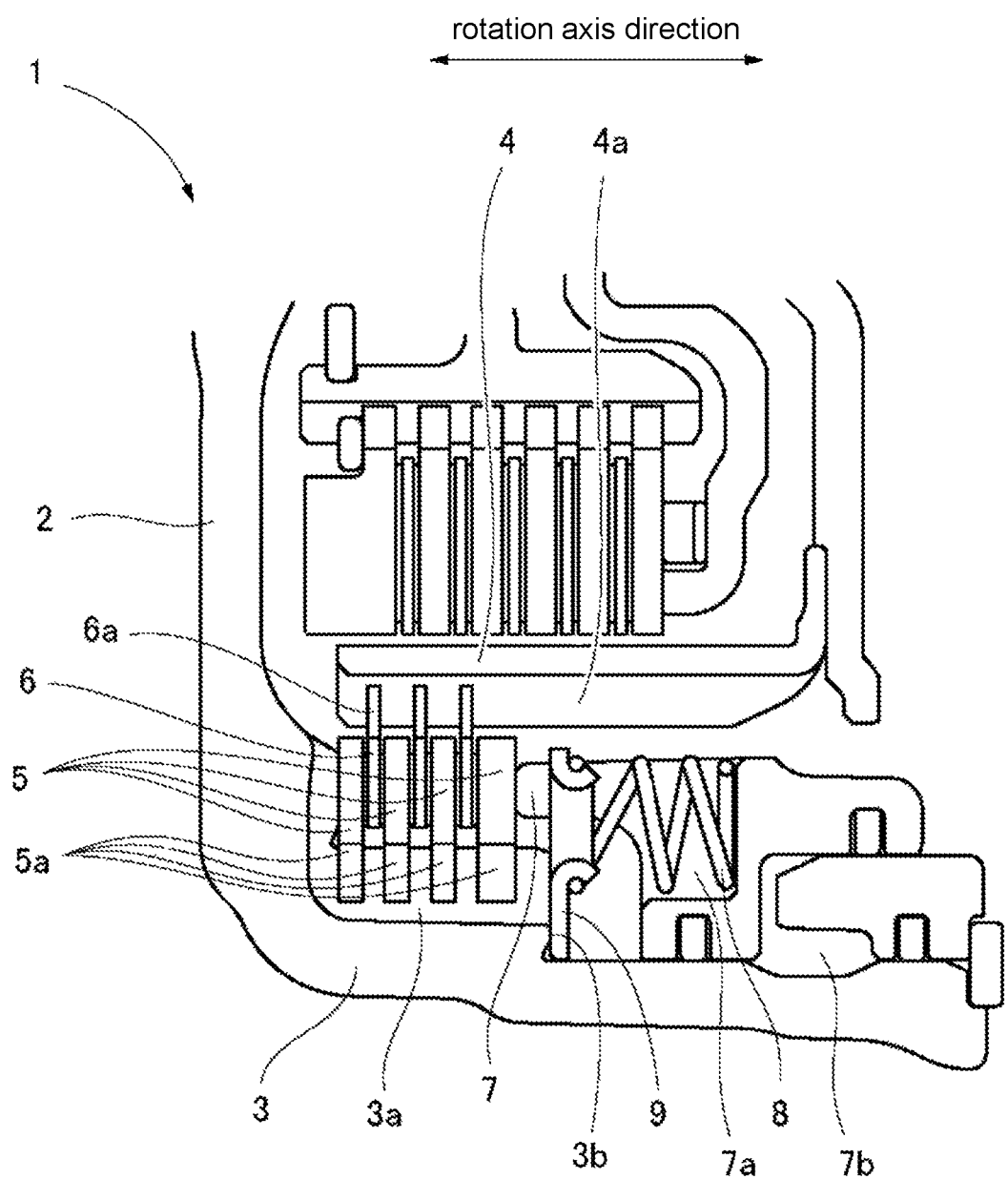
FIG. 1 is an explanatory view showing a frictional engagement device according to an embodiment of the disclosure.

A frictional engagement device according to an embodiment of the disclosure will be described with reference to the drawings. Referring to FIG. 1, a frictional engagement device 1 of the embodiment is disposed in a case 2 of a transmission and includes a cylindrical outer base body 3 integrally formed on the case 2 and fixed to the case 2, and an inner base body 4 disposed inside the outer base body 3 in a radial direction.

The inner base body 4 has an outer peripheral surface facing an inner peripheral surface of the outer base body 3 and is disposed inside the outer base body 3 to be relatively rotatable. A plurality of outer friction plates 5 are provided on the inner peripheral surface of the outer base body 3 to be rotatable integrally with the outer base body 3 relative to the inner base body 4 and to be slidable in a rotation axis direction.

Inner friction plates 6 are provided on an outer peripheral surface of the inner base body 4 to be rotatable integrally with the inner base body 4 relative to the outer base body 3 and to be slidable in the rotation axis direction. The inner friction plates 6 are disposed to be sandwiched between the outer friction plates 5, and a friction material is mounted on both surfaces of the inner friction plates 6 to increase a frictional force.

Outer sliding grooves 3a extending in the rotation axis direction are provided on the inner peripheral surface of the outer base body 3 at intervals in the circumferential direction. One end of each of the outer sliding grooves 3a in the rotational axis direction is open, and lubricating oil that has accumulated in each of the outer sliding grooves 3a is discharged from one open end which is open. The outer sliding grooves 3a are open radially inward. Therefore, the lubricating oil can also be discharged radially inward at the other end of the respective outer sliding grooves 3a.

A plurality of outer protruding pieces 5a which protrude outward in the radial direction are provided on an outer peripheral edge of each of the outer friction plates 5 at intervals in the circumferential direction. The outer protruding pieces 5a of the outer friction plates 5 are fitted into the outer sliding grooves 3a. The outer friction plates 5 rotate integrally with the outer base body 3 relative to the inner base body 4, and the outer friction plates 5 can also slide with respect to the outer base body 3 in the rotation axis direction by fitting the outer protruding pieces 5a into the outer sliding grooves 3a.

Inner sliding grooves 4a extending in the rotation axis direction are provided on the outer peripheral surface of the inner base body 4 at intervals in the circumferential direction. A plurality of inner protruding pieces 6a protruding inward in the radial direction are provided on an inner peripheral edge of each of the inner friction plates 6 at intervals in the circumferential direction. The inner protruding pieces 6a of the inner friction plates 6 are fitted into the inner sliding grooves 4a. The inner friction plates 6 rotate integrally with the inner base body 4 relative to the outer base body 3, and the inner friction plates 6 can also slide in the rotation axis direction with respect to the inner base body 4 by fitting the inner protruding pieces 6a into the inner sliding grooves 4a.

A piston 7 which presses the outer friction plates 5 and the inner friction plates 6 in the rotation axis direction to generate a frictional force and synchronizes the rotation of the outer base body 3 and the inner base body 4 to stop the rotation of the inner base body 4, and a plurality of return springs 8 which release the pressing of the outer friction plates 5 and the inner friction plates 6 by the piston 7 are provided in the frictional engagement device 1. The plurality of return springs 8 are disposed at regular intervals in the circumferential direction. The plurality of return springs 8 may be disposed at different intervals in the circumferential direction.

An annular stepped portion 3b is formed at one end portion of the outer sliding grooves 3a of the outer base body 3 by expanding a diameter of the inner peripheral surface thereof. An annular spring seat 9 is provided on this stepped portion 3b.

One end of the return springs 8 is fixed to the spring seat 9, and the other end thereof is in contact with the piston 7. A concave portion 7a recessed to receive the other end side of the return springs 8 is provided in the piston 7. Further, the frictional engagement device 1 includes a hydraulic chamber 7b. The piston 7 moves forward toward the outer friction plates 5 when a hydraulic pressure is supplied to the hydraulic chamber 7b, and a pressing force is applied to the outer friction plates 5 by the piston 7.

Figure 2:
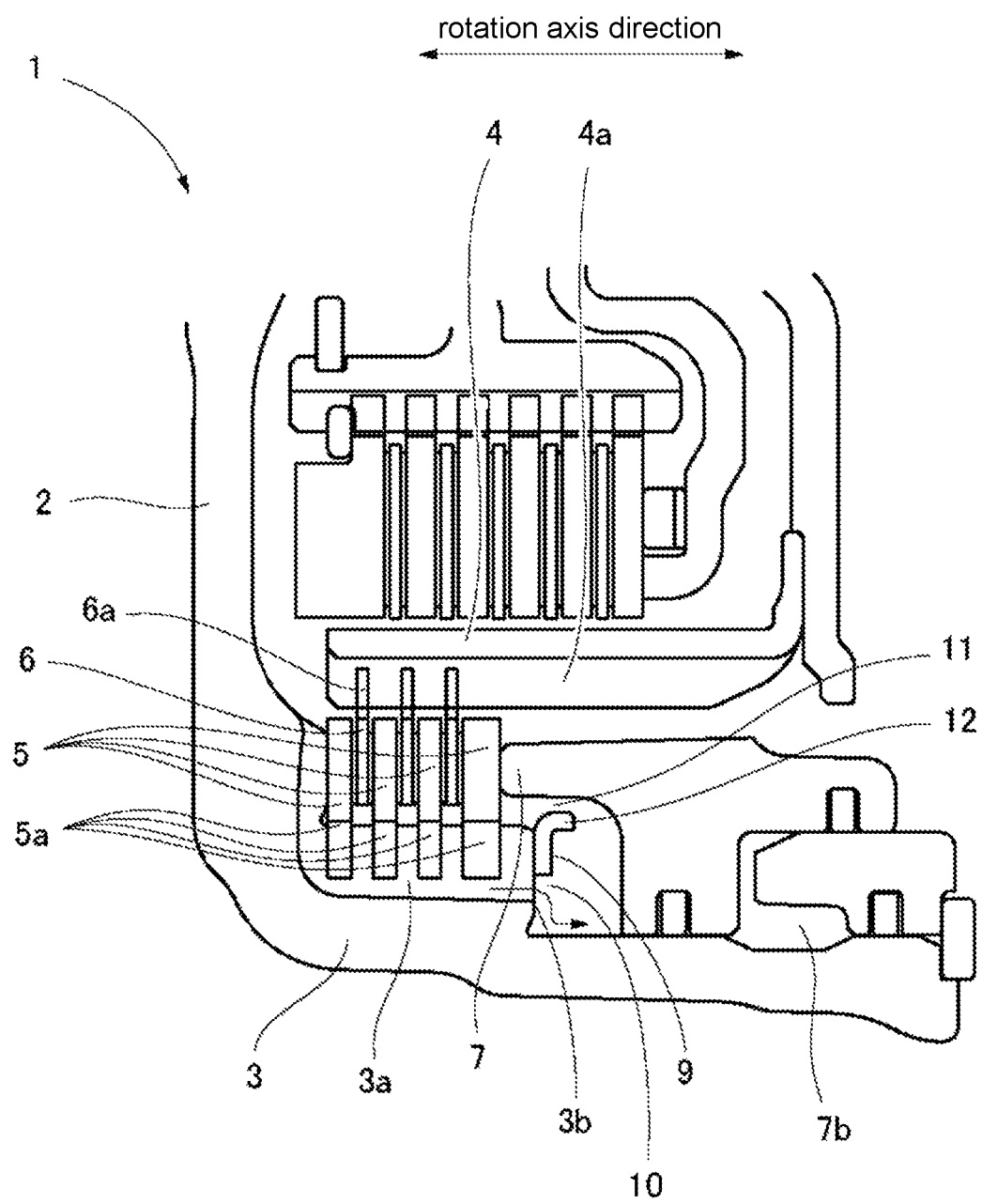
FIG. 2 is a cross-sectional view showing a through-hole of a frictional engagement device according to the embodiment.
Figure 3:
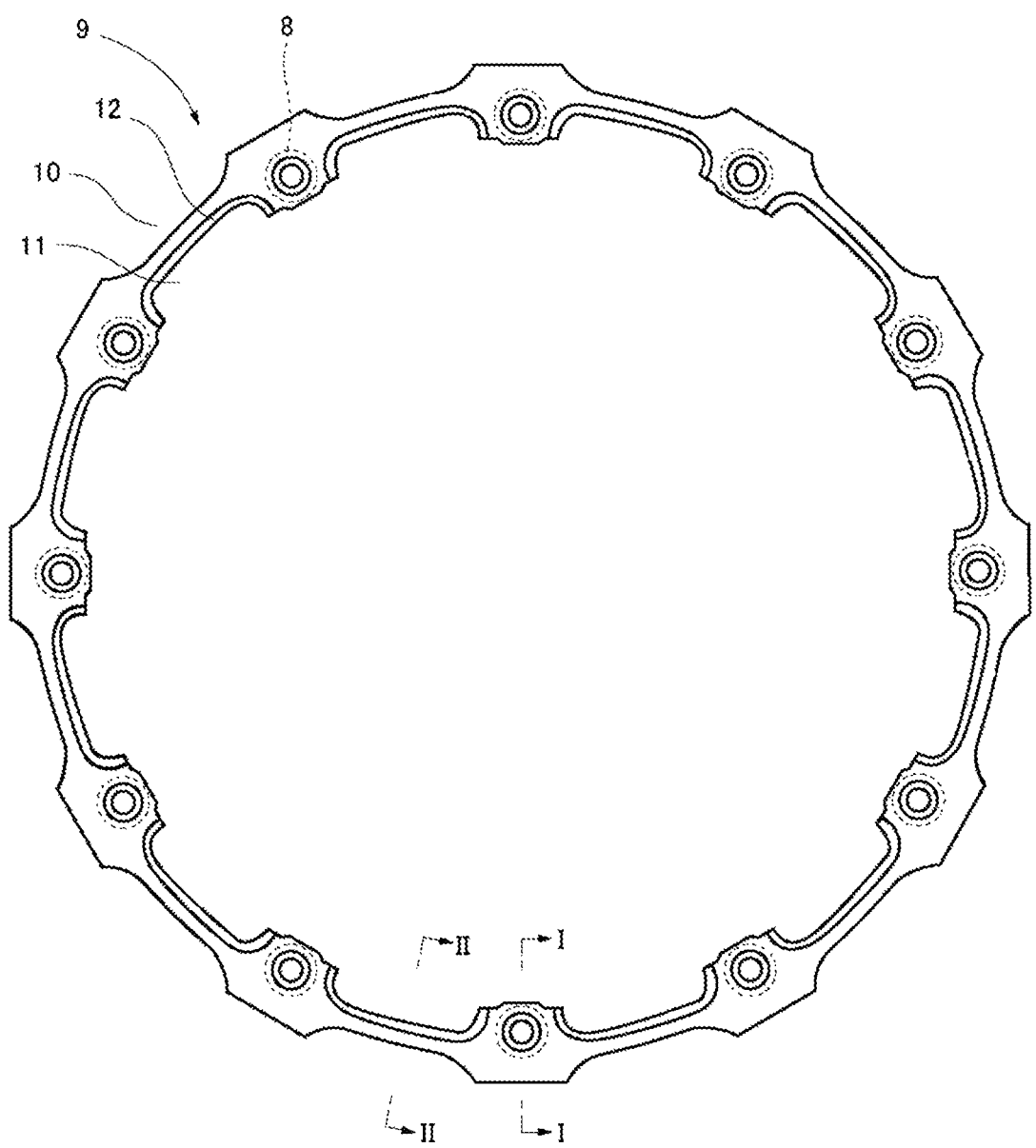
FIG. 3 is an explanatory view showing a spring seat of the embodiment.

FIG. 2 shows a cross section in which a phase thereof is changed from that of a cross section showing the return springs 8 in FIG. 1 and a phase of a cross section of the frictional engagement device 1 corresponds to a position of a tip end of the piston 7 in contact with the outer friction plates 5. FIG. 3 is a view showing the spring seat 9, line I-I shows a position of a cross section of the spring seat 9 of FIG. 1, and line II-II shows a position of the cross section of the spring seat 9 of FIG. 2.

The spring seat 9 has a through-hole 10 which is located between the adjacent concave portions 7a of the piston 7, in other words, at a position corresponding to the tip end of the piston 7 capable of coming into contact with the outer friction plates 5 and in which an outer edge thereof is formed to be recessed inward in the radial direction.

At least one through-hole 10 (preferably, all or almost all through-holes 10) is disposed to overlap an opening formed in one end portion of at least one outer sliding groove 3a. Thus, the lubricating oil that has accumulated in the outer sliding groove 3a can be discharged from the through-hole 10. Therefore, it is possible to prevent the case in which the lubricating oil accumulates in the outer sliding grooves 3a, more lubricating oil than necessary is supplied to spaces between the outer friction plates 5 and the inner friction plates 6, and thus frictional resistance increases even though the frictional engagement device 1 is in an open state.

Further, since the outer base body 3 is formed integrally with and fixed to the case 2 of the transmission and cannot be rotated, the lubricating oil that has accumulated in the sliding groove is not easily discharged. However, it is possible to discharge the lubricating oil that has accumulated in the outer sliding grooves 3a and is hard to discharge by providing the through-hole 10 in the spring seat 9 as in the embodiment.

As described above, according to the frictional engagement device 1 of the embodiment, it is possible to suppress the accumulation of the lubricating oil in the outer sliding grooves 3a, and thus it is possible to suppress or prevent occurrence of problems such as an unintended increase in friction due to the accumulated lubricating oil and unevenness in an oil level height inside the case 2 of the transmission.

Further, an escape portion 11 cut out in a circular arc shape to avoid the tip end of the piston 7 in contact with the outer friction plates 5 is provided in the spring seat 9. Also, in the spring seat 9, ribs 12 extending in a circular arc shape along an edge of the escape portion 11 extend toward one side (the hydraulic chamber 7b side) in the rotation axis direction. Due to the ribs 12, it is possible to compensate for reduced strength (durability) of the spring seat 9 due to the through-hole 10 and the escape portion 11.

The ribs 12 may be provided along an outer edge of the through-hole 10.

Also, in the embodiment, the brake in which the outer base body 3 is fixed to the case 2 has been described as the frictional engagement device, but the frictional engagement device of the disclosure is not limited thereto. For example, the outer base body 3 may also be a rotatable clutch like the inner base body. Also, the spring seat may be provided on the inner base body side. In this case, the lubricating oil that has accumulated in the inner sliding groove of the inner base body can be discharged from the through-hole provided in the spring seat.

Further, in the embodiment, the through-hole 10 is formed by recessing the outer edge of the spring seat 9, but the through-hole of the disclosure is not limited thereto, and it may be open to overlap one end of the sliding groove. For example, the through-hole of the disclosure may be a hole drilled in the spring seat 9.

What is claimed is:

1. A frictional engagement device, comprising:
a cylindrical outer base body;
an inner base body having an outer peripheral surface facing an inner peripheral surface of the outer base body and disposed inside the outer base body to be relatively rotatable;
an outer friction plate provided on the inner peripheral surface of the outer base body to be rotatable integrally with the outer base body relative to the inner base body and to be slidable in a rotation axis direction;
an inner friction plate provided to rotate integrally with the outer peripheral surface of the inner base body and to be slidable in the rotation axis direction;
a piston which presses the outer friction plate and the inner friction plate in the rotation axis direction to generate a frictional force and synchronizes rotation of the outer base body and the inner base body; and
a return spring which releases a pressing of the outer friction plate and the inner friction plate by the piston,
wherein a plurality of sliding grooves which guide sliding movement of the outer friction plate or the inner friction plate in the axial direction are provided in at least one of the outer base body and the inner base body at intervals in a circumferential direction,
the outer friction plate or the inner friction plate which slides in the sliding grooves includes protruding pieces fitted in the sliding grooves,
a spring seat which is located on one end portion of the sliding grooves provided in the outer base body and supports one end of the return spring, and
a lubricating oil discharging portion which communicates with the sliding grooves provided in the outer base body and is capable of discharging lubricating oil that has accumulated in the sliding grooves is provided on the spring seat,
wherein the frictional engagement device is disposed in a case,
the sliding grooves are provided in at least the outer base body,
the outer base body is fixed to the case,
a cutout portion which is cut out in a circular arc shape is provided in a radially inner end portion of the spring seat, and
ribs are provided continuously extending from a radially inner edge of the spring seat along the cutout portion in an arc shape,
the piston is configured to pass through a region surrounded by the cutout portion and the ribs.

2. The frictional engagement device according to claim 1, wherein:
lubricating oil discharging portion is located radially outside the spring seat.

3. The frictional engagement device according to claim 2, wherein the lubricating oil discharging portion is located radially inward from the inner peripheral surface of the outer base body.

4. The frictional engagement device according to claim 1, wherein the lubricating oil discharging portion is located radially inward from the inner peripheral surface of the outer base body.

5. The frictional engagement device according to claim 1, wherein the lubricating oil discharging portion is a through-hole.

6. The frictional engagement device according to claim 1, wherein the lubricating oil discharging portion is a recess.

* * * * *